United States Patent
Stamires et al.

(10) Patent No.: US 6,710,004 B2
(45) Date of Patent: Mar. 23, 2004

(54) PROCESS FOR THE PREPARATION OF ANIONIC CLAY AND BOEHMITE-CONTAINING COMPOSITIONS

(75) Inventors: Dennis Stamires, Newport Beach, CA (US); William Jones, Cambridge (GB); Paul O'Connor, Hoevelaken (NL)

(73) Assignee: Akzo Nobel nv (NL)

( * ) Notice: Subject to any disclaimer, the term of this patent is extended or adjusted under 35 U.S.C. 154(b) by 12 days.

(21) Appl. No.: 10/071,386

(22) Filed: Feb. 7, 2002

(65) Prior Publication Data

US 2002/0111263 A1 Aug. 15, 2002

Related U.S. Application Data

(60) Provisional application No. 60/267,469, filed on Feb. 9, 2001.

(30) Foreign Application Priority Data

Mar. 5, 2001 (EP) .............................. 01200805

(51) Int. Cl.$^7$ ................................. B01J 21/16
(52) U.S. Cl. ......................... 502/84; 502/80; 423/593; 423/600
(58) Field of Search ...................... 502/80, 84; 423/593, 423/600

(56) References Cited

U.S. PATENT DOCUMENTS

| | | | | |
|---|---|---|---|---|
| 4,656,156 A | * | 4/1987 | Misra | 502/415 |
| 6,028,023 A | * | 2/2000 | Vierheilig | 502/84 |
| 6,171,991 B1 | | 1/2001 | Stamires et al. | 501/141 |
| 6,376,405 B1 | | 4/2002 | Stamires et al. | 502/73 |
| 6,413,639 B1 | * | 7/2002 | Kobayashi et al. | 428/403 |
| 6,541,409 B1 | * | 4/2003 | Jones et al. | 502/84 |

FOREIGN PATENT DOCUMENTS

| | | | |
|---|---|---|---|
| WO | 99/41195 | 8/1999 | ............ C01F/7/00 |
| WO | 99/41196 | 8/1999 | ............ C01F/7/00 |
| WO | 99/41197 | 8/1999 | ............ C01F/7/00 |
| WO | 99/41198 | 8/1999 | ............ C01F/7/00 |
| WO | 00/44671 | 8/2000 | ............ C01F/7/00 |
| WO | 00/44672 | 8/2000 | ............ C01F/7/00 |

OTHER PUBLICATIONS

International Search Report for PCT/EP 02/01234; dated: Feb. 8, 2002.

*Catalysis Today,*; Hydrotalcite–Type Anionic Clays: Preparation, Properties, and Applications. 11 (1991) pp. 173–301; Cavani et al.

Anionic Clays: Trends in Pillaring Chemistry, Synthesis in Microporous Solids; 2 (1992) pp. 108–169; Roy et al.

Helv. Chim. Acta, 25, (1942) pp. 106–137 and 555–569; Von Feitknecht.

*Journal of American Ceramic Society;* Studies on 4CaO–Al$_2$O$_3$ .13H$_2$O and the Related Natural Mineral Hydrocalumite.(1959) vol. 42 No. 3; pp. 121–126; Buttle et al.

*Chemistry Letters;* Synthesis of New Hydrotalcite–Like Compounds and Their Physico–Chemical Properties. Miyata et al.; pp. 843–848 (1973).

*Clays and Clay Minerals;* The Syntheses of Hydrotalcite–Like Compounds and Their Structures and Physico–Chemical Properties–I: The Systems . . . ; Miyata et al. vol. 23 (1975) pp. 369–375.

*Clays and Clay Minerals;* Physico–Chemical Properties of Synthetic Hydrotalcites in Relation to Composition. Miyata et al.; vol. 28, No. 1, (1980) pp. 50–56.

*Clays and Clay Minerals;* Syntheses of Discolored and Al–Rich Hydrotalcite–Like Compounds. Pausch et al.; Vol 34 No. 5; (1986) pp. 507–510.

*Materials Chemistry and Physics,* Textural Properties of Hydrotalcite–Like Compounds . . . Ulibarri et al. vol. 14 (1986) pp. 569–579.

European Search Report, dated: Jul. 9, 2001 for ACH 2850 PDEP.

* cited by examiner

Primary Examiner—Tom Dunn
Assistant Examiner—Christina Ildebrando
(74) Attorney, Agent, or Firm—Louis A. Morris

(57) ABSTRACT

This invention relates to a process for the preparation of anionic clay and boehmite-containing compositions. These compositions may also contain unreacted trivalent metal source and/or divalent metal source. The process involves subjecting a precursor mixture comprising a divalent metal source and a trivalent metal source to at least two aging steps, wherein at least once between two aging steps an aluminum source is added. An advantage of the invention is that the crystallinity of the boehmite in the composition can be tuned.

15 Claims, No Drawings

PROCESS FOR THE PREPARATION OF ANIONIC CLAY AND BOEHMITE-CONTAINING COMPOSITIONS

CROSS REFERENCE TO RELATED APPLICATIONS

This application claims priority from U.S. Application No. 60/267,469, filed Feb. 9, 2001, and European Patent Application No. 01200805.8, filed Mar. 5, 2001, the contents of both applications being incorporated herein in their entirety.

BACKGROUND OF THE INVENTION

1. Field of the Invention

This invention relates to a process for the preparation of anionic clay and boehmite-containing compositions. The invention also relates to the preparation of catalyst compositions comprising anionic clay and boehmite-containing compositions.

2. Prior Art

Anionic clays have a crystal structure which consists of positively charged layers built up of specific combinations of metal hydroxides between which there are anions and water molecules. Hydrotalcite is an example of a naturally occurring anionic clay, in which carbonate is the predominant anion present. Meixnerite is an anionic clay wherein hydroxyl is the predominant anion present.

In hydrotalcite-like anionic clays the brucite-like main layers are built up of octahedra alternating with interlayers in which water molecules and anions, more particularly carbonate ions, are distributed. The interlayers may contain anions such as $NO_3^-$, $OH^-$, $Cl^-$, $Br^-$, $I^-$, $SO_4^{2-}$, $SiO_3^{2-}$, $CrO_4^{2-}$, $BO_3^{2-}$, $MnO_4^-$, $HGaO_3^{2-}$, $HVO_4^{2-}$, $ClO_4^-$, $BO_3^{2-}$, pillaring anions such as $V_{10}O_{28}^{6-}$ and $Mo_7O_{24}^{6-}$, monocarboxylates such as acetate, dicarboxylates such as oxalate, and alkyl sulphonates such as laurylsulphonate.

It should be noted that a variety of terms are used to describe the material that is referred to in this specification as an anionic clay. Hydrotalcite-like and layered double hydroxide are interchangeably used by those skilled in the art. In this specification we refer to these materials as anionic clays, comprising within that term hydrotalcite-like and layered double hydroxide materials.

These anionic clays can contain different divalent or trivalent metals. The most commonly described anionic clays are Mg—Al anionic clays. These anionic clays are suitable for many applications in the absorbent and catalyst field. Anionic clays from other divalent and/or trivalent metals have specific applications in these fields. Fe—Al anionic clays, for instance, are useful as hydrogenation catalysts; Zn—Cr anionic clays can be used as catalysts in oxidation reactions.

Anionic clays have been described in many prior art publications. Two major reviews of anionic clay chemistry were published in which the synthesis methods available for anionic clay synthesis have been summarised: F. Cavani et al "Hydrotalcite-type anionic clays: Preparation, Properties and Applications," *Catalysis Today*, 11 (1991) Elsevier Science Publishers B. V. Amsterdam; and J P Besse and others *"Anionic clays: trends in pillary chemistry, its synthesis and microporous solids"* (1992), 2, 108, editors: M. I. Occelli, H. E. Robson, Van Nostrand Reinhold, N.Y.

In the above reviews basically two types of anionic clay preparation are described. The most conventional method is co-precipitation (in Besse this method is called the salt-base method) of a soluble divalent metal salt and a soluble trivalent metal salt, optionally followed by hydrothermal treatment or aging to increase the crystallite size. The second method is the salt-oxide method in which a divalent metal oxide is reacted at atmospheric pressure with a soluble trivalent metal salt, followed by aging under atmospheric pressure. This method has only been described for the use of ZnO and CuO in combination with soluble trivalent metal salts.

For work on anionic clays, reference is further made to the following articles:
*Helv. Chim. Acta,* 25, 106–137 and 555–569 (1942)
*J. Am. Ceram. Soc.,* 42, no. 3, 121 (1959)
*Chemistry Letters (Japan),* 843 (1973)
*Clays and Clay Minerals,* 23, 369 (1975)
*Clays and Clay Minerals,* 28, 50 (1980)
*Clays and Clay Minerals,* 34, 507 (1996)
*Materials Chemistry and Physics,* 14, 569 (1986).

In addition there is an extensive amount of patent literature on the use of anionic clays and processes for their preparation.

Several patent applications relating to the production of anionic clays from inexpensive raw materials have been published. These materials include magnesium oxide, aluminum trihydrate, and boehmite.

WO 99/41198 relates to the production of anionic clay from two types of aluminum compounds and a magnesium source. One of the aluminum compounds is aluminum trihydrate or a thermally treated form thereof.

WO 99/41196 discloses the preparation of anionic clays with acetate as the charge balancing anion from magnesium acetate, another magnesium source, and aluminum trihydrate.

In WO 99/41195 a continuous process is described for the production of a Mg—Al anionic clay from a magnesium source and aluminum trihydrate.

WO 99/41197 discloses the production of an anionic clay-containing composition comprising a Mg—Al anionic clay and unreacted aluminum trihydrate.

WO 00/44672 discloses the production of anionic clays by hydrothermal treatment of a slurry of a magnesium source and boehmite, which has been peptised by an inorganic acid. By using an excess of boehmite, unreacted boehmite ends up in the composition.

WO 00/44671 relates to compositions comprising Mg—Al anionic clay and boehmite. These compositions are prepared from boehmite and a magnesium source not being hydromagnesite. The boehmite in the composition results from an excess of boehmite starting material, which ends up in the composition as unreacted boehmite.

There are many fields of use for anionic clays. These include but are not restricted to: catalysts, adsorbents, drilling muds, fillers for plastics, water treatment materials, catalyst supports and carriers, extenders and applications in the medical field. In particular Van Broekhoven (U.S. Pat Nos. 4,956,581 and 4,952,382) has described their use in $SO_x$ abatement chemistry.

SUMMARY OF THE INVENTION

In one embodiment, the present invention comprises a process for the preparation of anionic clay and boehmite-containing compositions. The process according to the invention comprises subjecting a precursor mixture comprising a divalent metal source and a trivalent metal source to at least two aging steps, wherein at least once between two aging steps an aluminum source is added. Optionally, these compositions may also contain unreacted trivalent metal source and/or divalent metal source.

In another embodiment, the present invention comprises the anionic clay and boehmite-containing composition obtained by the above process.

Other embodiments of the present invention include the use of specific reactants in the above precursor mixture, the use of the above anionic clay and boehmite-containing composition as a precursor in making other compositions, such as catalysts, and conditions employed in the making of the various compositions.

DETAILED DESCRIPTION OF THE INVENTION

One of the advantages of performing at least two aging steps with intermediate aluminum source addition is that it provides a way to tune the crystallinity of the boehmite in the composition. As the surface area, pore volume, pore size distribution, density, binding properties, and catalytic activity of boehmites depends on their crystallinity, tuning of their crystallinity is very desirable. This tuning can be achieved by using a different pH and/or temperature in each of the aging steps and/or by adding different aluminum sources in between aging steps.

Furthermore, this process offers a way to easily control the anionic clay to boehmite ratio. This can be especially useful for catalysis or adsorption purposes. Anionic clay mainly possesses basic sites; boehmite primarily consists of acidic sites. Therefore, by varying the anionic clay to boehmite ratio, the ratio of acidic to basic sites can be varied as well.

To obtain a catalyst composition comprising an anionic clay and boehmite-containing composition obtainable by the process according to the invention, the anionic clay and boehmite-containing composition is added to a slurry containing the other catalyst components or precursors thereof and finally shaped.

The present invention relates to a process for the preparation of anionic clay and boehmite-containing compositions. This process involves the use of relatively inexpensive starting materials, such as oxides, hydroxides, carbonates, and hydroxy carbonates. Therefore, washing and filtering steps are not essential in this process. Moreover, this process is particularly environmentally friendly and well suited to the environmental constraints which are increasingly imposed on commercial operations.

The process comprises subjecting a precursor mixture comprising a divalent metal source and a trivalent metal source, optionally comprising an aluminum source, to at least two aging steps, wherein at least once between two aging steps an aluminum source is added. During aging, boehmite is formed from aluminum source.

The resulting compositions may also contain unreacted (which means: not reacted to anionic clay or boehmite) divalent metal compounds, aluminum source and/or other trivalent metal compounds.

Boehmite materials are characterised by their powder X-ray diffraction (XRD) lines. The ICDD contains entries for boehmite and confirms that there would be reflections corresponding to the (020), (021), and (041) planes. For copper radiation, such reflections would appear at 14, 28, and 38 degrees 2-theta.

The various forms of boehmite can be distinguished by the relative intensity and width of the reflections.

As mentioned before, one of the advantages of the invention is that the crystallinity of the boehmite in the composition can be tuned. In this specification, the width at half height of the (020) diffraction line is taken as a measure of the crystallinity of boehmite. As the crystallinity increases, the peak width decreases, i.e. the peaks become sharper.

The group of boehmites can be divided in two main parts: quasi-crystalline boehmites (QCBs), which have a (020) peak width at half height of at least 1.5 degrees 2-theta, and micro-crystalline boehmites (MCBs), which have a (020) peak width at half height smaller than 1.5 degrees 2-theta.

QCBs usually have very high surface areas, large pores and high pore volumes, and they are more easily peptisable with acids and more reactive towards, e.g., silicates and phosphates than MCBs. They have lower specific densities and contain larger amounts of intercalated water molecules upon hydration than MCBs. QCBs contain about 1.4–2.0 moles of water per mole of Al and MCBs contain 1.0–1.4 moles of water per mole of Al.

As the amount of water intercalated into the QCB crystal increases, the main (020) XRD reflection moves to lower 2-theta values, corresponding to greater d-spacings.

The Aluminum Source

Suitable aluminum sources to be used in the process according to the invention are aluminum trihydrate or its thermally treated form, aluminum sols, gels, quasi-crystalline boehmite, micro-crystalline boehmite, aluminum salts such as aluminum nitrate, aluminum chloride, aluminum chlorohydrate, and sodium aluminate, and mixtures thereof. Preferably, aluminum trihydrate or its thermally treated form is used.

In the present invention aluminum trihydrate includes crystalline aluminum trihydrate (ATH), for example gibbsites provided by Reynolds Aluminum Company RH-20® or J M Huber Micral® grades. Also BOC (Bauxite Ore Concentrate), bayerite and nordstrandite are suitable aluminum trihydrates. BOC is the cheapest alumina source. The aluminum trihydrate is preferred to have a particle size ranging from 1 to 150 $\mu$m, more preferably smaller than 20 $\mu$m.

In another embodiment of the invention thermally treated forms of gibbsite are used. Combinations of aluminum trihydrate and thermally treated forms of aluminum trihydrate can also be used. The calcined aluminum trihydrate is readily obtained by thermally treating aluminum trihydrate (gibbsite) at a temperature above 100° C., preferably ranging from 100° to 800° C. for 15 minutes to 24 hours. In any event, the calcination temperature and time for obtaining calcined aluminum trihydrate should be sufficient to cause a measurable increase of the surface area compared to the surface area of the gibbsite as produced by the Bayer process which is generally between 30 and 50 m$^2$/g.

It should be noted that within the context of this invention flash-calcined alumina is also considered to be a thermally treated form of aluminum trihydrate. Flash-calcined alumina is obtained by treating aluminum trihydrate at temperatures between 800°–1000° C. for very short periods of time in special industrial equipment, as is described in U.S. Pat. Nos. 4,051,072 and 3,222,129.

The aluminum source may be doped with metal compounds like for instance rare earth metals or transition metals. Examples include compounds of B, Ce, La, V, Zn, Cu, Co, and combinations thereof. The dopants can be present in amounts between 1 and 50 wt %, preferably lower than 25 wt % and more preferably lower than 10 wt %. This doped aluminum source can be obtained by thermal or hydrothermal treatment of a precursor of the aluminum source with the dopant. Preferably oxides, hydroxides and carbonates of the above-indicated metals are fused, but also nitrates, chlorides, sulphates and phosphates can be used.

When a doped aluminum source is used in the process according to the invention doped boehmite will be present in the final product. This may be beneficial for several applications in the catalyst and adsorbent field.

Trivalent Metal Sources

The trivalent metal sources that can be used for preparing the anionic clay and boehmite-containing composition can be the aluminum sources mentioned above, salts, hydroxides, oxides or alkoxides of trivalent metals such as B, Ga, In, Bi, Fe, Cr, Sc, La, Ce, and mixtures of these compounds. Preferably oxides, hydroxides, carbonates, hydroxy carbonates, carboxylates or alkoxides are used.

Both solid trivalent metal sources and soluble trivalent metal sources are suitable. Combinations of trivalent metal sources may be used as well. The metal source may be fed to the reactor as a solid, a solution, or, preferably, as a slurry.

Divalent Metal Source

Suitable divalent metal sources to be used in the process according to the invention are compounds containing $Mg^{2+}$, $Ca^{2+}$, $Ba^{2+}$, the transition metals $Zn^{2+}$, $Mn^{2+}$, $Co^{2+}$, $Mo^{2+}$, $Ni^{2+}$, $Fe^{2+}$, $Sr^{2+}$, $Cu^{2+}$, and mixtures of said compounds. Prefer oxides, hydroxides, carbonates, or hydroxy carbonates are used. Both solid divalent metal sources and soluble divalent metal sources are suitable. Combinations of metal sources may be used as well.

The metal source may be fed to the reactor as a solid, a solution, or, preferably, as a slurry. The metal source may also be combined with the trivalent metal source before it is fed to the reactor. Especially when using metal sources like oxides, hydroxides, carbonates or hydroxy carbonates, it is usually advisable to mill the metal source before use. Preferably, both the trivalent metal source and the divalent metal source are milled before use. When wet milling is used, the slurry containing both the trivalent metal source and the divalent metal source may be wet milled, for instance in a ball mill.

Conditions

A divalent metal source and a trivalent metal source are added to a reactor and aged in at least two steps, wherein at least once between two aging steps an aluminum source is added. The reactor may be equipped with stirrers or baffles to ensure homogeneous mixing of the reactants. It may be heated by any heating source such as a furnace, microwave, infrared sources, heating jackets (either electrical or with a heating fluid), and lamps. Because of its simplicity, this process is particularly suitable to be carried out in a continuous mode.

The precursor mixture in the reactor may be obtained by either adding slurries of the starting materials, either combined or separate, to the reactor or adding the divalent metal source to a slurry of the trivalent metal source or vice versa and adding the resulting slurry to the reactor. It is possible to treat, for instance, the slurry containing the trivalent metals source at elevated temperature and then add either the divalent metal source per se, or add these metal sources in a slurry or solution either to the reactor. The solids content in the reactor is preferably less than 40 wt %, and ranges more preferably from 10 to 20 wt %.

The overall divalent metal to trivalent metal molar ratio used in the process according to the invention is preferably less than 3, more preferably less than 2 and most preferably less than 1. By varying this ratio the anionic clay to boehmite ratio in the final product can be tuned. The desired ratio will depend on the application of the final product.

If the only trivalent metal used in the process is aluminum, the total amount added during the entire process is such that beside anionic clay also boehmite is formed.

If besides aluminum another trivalent metal is used, the aluminum source and other trivalent metal source have to be used in such amounts that beside anionic clay also boehmite is formed. These amounts will depend on the nature of the aluminum source and the other trivalent metal source, more in particular their reactivity towards anionic clay formation. The exact amounts can easily be obtained by routine experimentation.

The at least two aging steps can be conducted at the same or different conditions. Hence, the first aging step can be conducted at a higher temperature and/or pH than a following aging step or vice versa. For instance, the first aging step can be performed under hydrothermal conditions, whereas a following aging step is performed under non-hydrothermal conditions. On the other hand, the first aging step can be performed under non-hydrothermal conditions and a following aging step under hydrothermal conditions. It is also possible to perform the aging steps at the same temperature and pH.

Within the context of this description hydrothermal means in the presence of water (or steam) at a temperature above 100° C. at increased pressure, e.g autogenous pressure.

Under hydrothermal conditions mainly MCB is formed, whereas at lower temperatures (i.e. lower than 85° C.) substantially QCB is formed. Furthermore, at a pH between 1 and 6 mainly QCB is formed, whereas at higher pH mainly MCB is formed. Therefore, this process offers a good way to vary the crystallinity of the boehmite.

Preferably, 2–5 aging steps are performed, more preferably 2–3, and most preferably 2 aging steps are performed.

At least once between the aging steps an aluminum source is added, preferably in the form of a slurry. If more than two aging steps are used, aluminum source can be added only once between two aging steps, or more than once, e.g. between every two aging steps.

If the trivalent metal source already comprises an aluminum source, this aluminum source can either be the same as or be different from the aluminum source added between the aging steps.

In between aging steps the intermediate product may optionally be dried. If between these aging steps an aluminum source is added, drying is preferably performed before this addition.

If desired, organic or inorganic acids and bases, for example for control of the pH, may be fed to the reactor or added to either one of the metal sources before they are fed to the reactor. The pH may vary over a wide range and may depend on the crystallinity of the boehmite that is desired. An example of a preferred pH modifier is an ammonium base, because upon drying no deleterious cations remain in the anionic clay.

The resulting composition may optionally be calcined at temperatures between 300° and 1200° C., preferably 300° to 800° C. and most preferably 300°–600° C. for 15 minutes to 24 hours, preferably 1–12 hours and most preferably 2–6 hours. By this treatment the anionic clay will be transformed into a solid solution and/or spinel. Solid solutions posses the well known memory effect, which means that they can be transformed back into anionic clays upon rehydration.

Rehydration can be performed by contacting the solid solution-containing composition in water for 1–24 hours at thermal or hydrothermal conditions, preferably at 65°–85° C. Preferably, the slurry is stirred and has a solids content ranging from about 10 to 50 wt %. During this treatment anions can be present. Examples of suitable anions are carbonate, bicarbonate, nitrate, chloride, sulphate, bisulphate, vanadates, tungstates, borates, phosphates, pillaring anions such as $HVO_4^-$, $V_2O_7^{4-}$, $HV_2O_{12}^{4-}$, $V_3O_9^{3-}$, $V_{10}O_{28}^{6-}$, $Mo_7O_{24}^{6-}$, $PW_{12}O_{40}^{3-}$, $B(OH)_4^-$, $B_4O_5(OH)_4^{2-}$, $[B_3O_3(OH)_4]^-$, $[B_3O_3(OH)_5]^{2-}$ $HBO_4^{2-}$, $HGaO_3^{2-}$, $CrO_4^{2-}$, and Keggin-ions, formate, acetate, and mixtures thereof.

The present invention is therefore also directed to a process wherein an anionic clay and boehmite-containing composition prepared by the process according to the invention is heat-treated at a temperature between 300° and 1200° C. to form a solid solution and/or spinel-containing composition, optionally followed by rehydration to obtain an anionic clay-containing composition.

If desired, the anionic clay and boehmite-containing composition prepared by the process according to the invention may be subjected to ion-exchange. Upon ion-exchange the interlayer charge-balancing anions are replaced with other anions. Examples of suitable anions are carbonate, bicarbonate, nitrate, chloride, sulphate, bisulphate, vanadates, tungstates, borates, phosphates, pillaring anions such as $HVO_4^-$, $V_2O_7^{4-}$, $HV_2O_{12}^{4-}$, $V_3O_9^{3-}$, $V_{10}O_{28}^{6-}$, $Mo_7O_{24}^{6-}$, $PW_{12}O_{40}^{3-}$, $B(OH)_4^-$, $B_4O_5(OH)_4^{2-}$, $[B_3O_3(OH)_4]^-$, $[B_3O_3(OH)_5]^{2-}$ $HBO_4^{2-}$, $HGaO_3^{2-}$, $CrO_4^{2-}$, and Keggin-ions, formate, acetate, and mixtures thereof. The ion-exchange can be conducted before or after drying the anionic clay and boehmite-containing composition formed in the slurry.

For some applications it is desirable to have additives, both metal compounds and non-metal compounds, comprising rare earth metals (e.g. Ce, La), Si, P, B, group VI, group VIII, alkaline earth (for instance Ca and Ba) and/or transition metals (for example Mn, Fe, Ti, Zr, Cu, Ni, Zn, Mo, V, W, Sn), present. The additives can be deposited on the anionic clay and boehmite-containing composition according to the invention or they can be added either to the divalent metal source or trivalent metal source which are added to the reactor or added to the reactor separately, either before the first aging step or in between aging steps. Suitable sources of metal compounds or non-metal compounds are oxides, halides or any other salt such as chlorides, nitrates etcetera.

The resulting compositions can advantageously be used as adsorbent, catalyst additive, or matrix. Boehmite, already present in the composition, acts as a binder for the anionic clay in the composition. The compositions can be used as hydroprocessing catalysts, Fisher Tropsch catalysts, catalysts to convert gases into hydrocarbon liquids, and they are very suitable for sulphur and nitrogen reduction in gasoline and diesel fuels and for $SO_x/NO_x$ removal in FCC units. By varying the individual components in the composition the effectiveness of the adsorbent can be optimized.

The compositions prepared by the process according to the invention are also suitable as metal trap in the FCC unit. The compositions are especially advantageous for this purpose due to the control of the crystallinity of the boehmite within the composition. For example, QCBs are known to convert heavier bottoms to lighter products, whereas MCBs are effective agents to passivate nickel and vanadium metal contaminants. Therefore, the compositions according to the invention, wherein the ratio of the different types of boehmite can be controlled, are very useful in catalysts for the conversion of heavy bottoms.

Catalyst compositions comprising anionic clay and boehmite-containing compositions are prepared by
 a. preparing an anionic clay and boehmite-containing composition by the process according to the invention,
 b. adding the composition to a slurry containing the other catalyst components or precursors thereof, and
 c. shaping the resulting composition The anionic clay and boehmite-containing composition can be added to the slurry of step b in suspended form, as a dry powder (dried for instance between 100° and 200° C.), or as a shaped body, e.g. a microsphere, a (milled) granule, etc. Optionally, acid or base treatment, thermal or hydrothermal treatment, or a combination thereof is performed on the anionic clay and boehmite-containing composition before addition to the slurry. The slurry may contain conventional catalyst components such as matrix or filler materials (e.g. clay, such as kaolin, titanium oxide, zirconia, alumina, silica, silica-alumina, and bentonite), molecular sieve material (e.g. ZSM-5, zeolite Y, US Y, and rare earth exchanged zeolite Y), and/or metal salts and additives. The slurry is preferably kept at a temperature in the range 15° to 40° C. and standard pressure for a time ranging from 1 minute to 4 hours.

The resulting catalyst compositions are shaped. Suitable shaping methods include spray-drying, pelletising, extrusion (optionally combined with kneading), beading, or any other conventional shaping method used in the catalyst and absorbent fields or combinations thereof. The amount of liquid present in the slurry used for shaping should be adapted to the specific shaping step to be conducted.

It might be advisable to partially remove the liquid used in the slurry and/or add an additional or another liquid, and/or change the pH of the precursor mixture to make the slurry gellable and thus suitable for shaping. Various additives commonly used in the various shaping methods such as extrusion additives may be added to the precursor mixture used for shaping. The resulting catalyst compositions comprise 5 to 40 wt % of the anionic clay and boehmite-containing composition.

The invention is illustrated by the following examples.

EXAMPLES

The following Examples show that with the process according to the invention the crystallinity of the boehmite can be tuned and the anionic clay to boehmite ratio can be controlled.

Example 1

A slurry of Catapal was peptised with $HNO_3$. MgO was added to the slurry to adjust the Mg/Al ratio to close to 1. The resulting slurry was high shear mixed at pH 9 and subjected to a first aging step at 85° C. for 12 hours. The product was dried at 100° C. overnight. The half-width of (020) boehmite reflection was 1.43° 2-theta. The anionic clay to boehmite ratio was approximately 3.

Next, dried product was suspended in water and an amount of flash-calcined BOC was added under high-shear mixing in order to adjust the Mg/Al ratio to close to 0.5. A second aging step was conducted at a temperature of 165° C. for 2 hours. XRD showed that the resulting product was a composition containing anionic clay and boehmite. The half-width of (020) boehmite reflection was 1.09° 2-theta and the ratio of clay to boehmite was approximately 1.

Example 2

Example 1 was repeated, except that the aluminum source which was added before the second aging step was gibssite.

XRD showed that the resulting product was a composition containing anionic clay and boehmite in a ratio close to 1. The half-width of (020) boehmite reflection was 1.06° 2-theta.

Example 3

Example 2 was repeated, except that the first aging step was conducted at 165° C. for 2 h. The final product was an anionic clay and boehmite-containing composition with a half-width of (020) boehmite reflection of 0.77° 2-theta.

Example 4

Fine particle gibbsite and MgO were milled in a slurry. The Mg/Al ratio in the slurry was about 1. The slurry was subjected to a first aging step at 165° C. for 2 hours. The product was dried at 100° C. The anionic clay to boehmite ratio was close to 1 and the boehmite half-width was 0.86° 2-theta.

Next, flash-calcined BOC was added to the slurry in order to decrease the Mg/Al ratio to about 0.5. Subsequently, the slurry was high-shear mixed at the pH of 10.5. A second aging step was applied at a temperature of 85° C. for 12 hours. Finally, the product was filtered, washed and dried.

XRD showed the formation of anionic clay and boehmite. The half-width of (020) boehmite reflection was 0.75° 2-theta.

Example 5

Example 4 was repeated, except that the aluminum source which was added before the second aging step was an amorphous gel alumina (Chattem).The resulting Mg/Al ratio was 0.5. The half-width of (020) boehmite reflection was 0.79° 2-theta.

Example 6

Flash-calcined BOC and zinc-hydroxy carbonate were mixed in a slurry. The Zn/Al ratio was about 2.5. The resulting mixture was subjected to a first aging step at 65° C. for 8 hours. Next, additional flash-calcined BOC was added under high-shear mixing in order to adjust the Zn/Al ratio to close to 1.0. A second aging step was conducted at a temperature of 95° C. and a pH of about 5–6 during 8 hours.

XRD showed that the resulting product was a composition containing anionic clay and quasi-crystalline boehmite.

What is claimed is:

1. A process for the preparation of an anionic clay and boehmite-containing composition wherein a precursor mixture comprising a divalent metal source and a trivalent metal source is subjected to at least two aging steps and wherein at least once between two aging steps an aluminum source is added.

2. The process according of claim 1 wherein the first aging step is conducted at a higher temperature than a following aging step.

3. The process of claim 2 wherein the first aging step is conducted under hydrothermal conditions and a following aging step under non-hydrothermal conditions.

4. The process of claim 1 wherein the first aging step is conducted at lower temperature than a following aging step.

5. The process of claim 4 wherein the first aging step is conducted under non-hydrothermal conditions and a following aging step under hydrothermal conditions.

6. The process of claim 1 wherein at least two of the aging steps are conducted at a different pH.

7. The process of claim 1 wherein the aluminum source added between two aging steps is aluminum trihydrate or a thermally treated form thereof.

8. The process of claim 1 wherein at least once between two aging steps a drying step is conducted.

9. The process of claim 1 conducted in a continuous mode.

10. The process of claim 1 wherein the divalent metal source is an oxide, hydroxide, carbonate of hydroxy carbonate of magnesium, copper, or zinc.

11. The process of claim 1 wherein the trivalent metal source is an oxide or hydroxide of Al, Ga, Fe, La, or Ce.

12. The process of claim 1 wherein additives are present during at least one of the aging steps.

13. The process of claim 1 wherein the anionic clay and boehmite-containing composition is subjected to an ion-exchange treatment.

14. A process for the preparation of a solid solution and/or spinel-containing composition, wherein the anionic clay and boehmite-containing composition prepared in accordance with the process of claim 1 is subjected to a heat-treatment at a temperature between 300 and 1200° C.

15. A process for the preparation of an anionic clay-containing composition, wherein the anionic clay and boehmite-containing composition prepared in accordance with the process of claim 1 is subjected to a heat-treatment at a temperature between 300 and 1200° C. to form a solid solution-containing composition, and the latter composition is rehydrated to form an anionic clay-containing composition.

* * * * *